United States Patent [19]

Horton, Jr.

[11] 4,228,588
[45] Oct. 21, 1980

[54] GRADE CHECKER

[76] Inventor: Lloyd E. Horton, Jr., New Milford, Pa. 18834

[21] Appl. No.: 961,647

[22] Filed: Nov. 17, 1978

[51] Int. Cl.³ ............................................. G01C 15/00
[52] U.S. Cl. ........................................ 33/1 H; 33/413; 33/451; 33/1 LE
[58] Field of Search ............... 33/1 H, 1 LE, 86, 88, 33/293, 294, 295, 296, 290, 137, 138, 413, 451

[56] References Cited
U.S. PATENT DOCUMENTS

| D. 168,400 | 12/1952 | Harris | 33/1 LE |
|---|---|---|---|
| 433,697 | 8/1890 | Reichenbach | 33/86 |
| 854,916 | 5/1907 | Stoner | 33/86 |
| 907,329 | 12/1908 | Fusco | 33/86 |
| 987,863 | 3/1911 | Cram | 33/1 H |
| 3,105,303 | 10/1963 | Frizzell | 33/138 |
| 3,890,717 | 6/1975 | Haun | 33/86 |

FOREIGN PATENT DOCUMENTS 511057 10/1930 Fed. Rep. of Germany ............ 33/293
311512 11/1955 Switzerland ........................... 33/1 LE Primary Examiner—John W. Shepperd

[57] ABSTRACT

A grade checker is disclosed to include a vertically disposed telescopic surveying rod, having graduations. A line reel is connected to the top end of a reciprocating rod, and a line guide is connected to the bottom of the recirpocating rod. There is a bull's-eye level on the surveying rod/handle to indicate "true" vertical. A line level on the line indicates "true" horizontal. When the end of the line is connected to a grade stake, and the surveying rod is adjusted, the final grade/cut or fill requirements can be determined.

1 Claim, 1 Drawing Figure

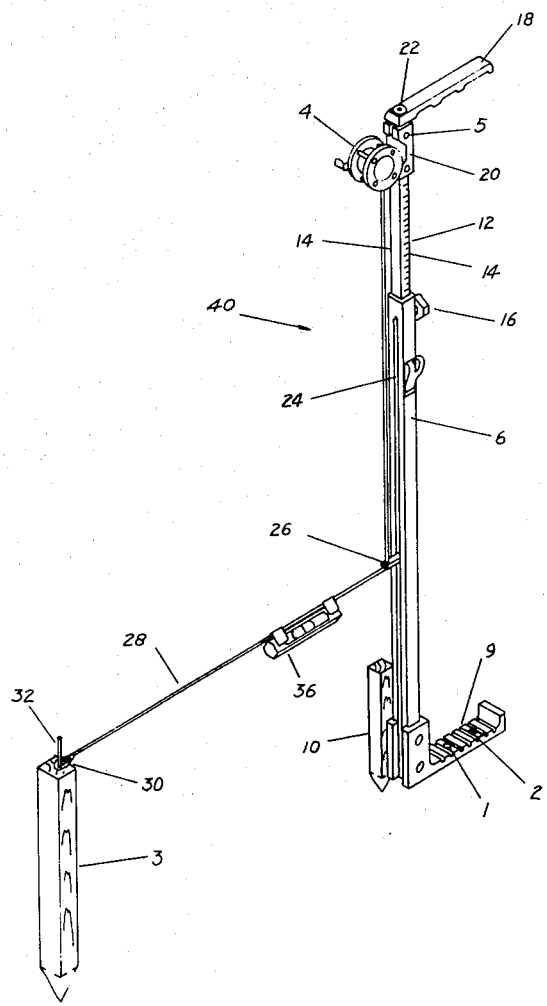

GRADE CHECKER

BACKGROUND OF THE INVENTION

This invention is directed to a surveyor's grade checker, and more particularly, to a grade checker that can be used by one person to determine the final grade of an earthwork grade before a surface course is laid. Also, it is used to determine the accuracy of the final grade or surface course.

The conventional height rod or grade checker which is used in surveying, consists of a straight rod, graduated in feet and decimals. Considerable time and effort is involved in setting up an engineer's level to accurately determine differences in elevation by taking vertical rod readings. Similarly, when measuring distances between points above ground, it is important that the line extend horizontally between the two points involved. This requirement is difficult to fulfill if the line and rod must be separately held.

A search of the Patent Office records developed the following list of patents on surveying rods:
U.S. Pat. No. 828,166 Wiswall; U.S. Pat. No. 886,354 Darling; U.S. Pat. No. 907,329 Fusco, U.S. Pat. No. 1,445,526 McMorris; U.S. Pat. No. 2,058,998 Koulichkov; U.S. Pat. No.2,088,394 Wright; U.S. Pat. No. 3,105,303 Frizzell.

The surveying rods shown in the above patents include a vertically disposed rod with graduations and a means to raise or lower the height of the rod. The leveling instrument disclosed by Frizzell in U.S. Pat. No. 3,105,303, discloses a vertically disposed rod with graduations. A sleeve is slipped over the rod to move along the rod. A measuring tape reel is mounted on the sleeve. The leveling instrument is used as a surveying instrument to measure the height of the grade and the distance from point to point. The Frizzell instrument is used with another instrument, thereby requiring at least two people. Further, the instrument is operated differently from the grade checker of my invention.

SUMMARY OF THE INVENTION

A grade checker is disclosed for checking the final cut or grade or before applying the surface layer and to check accuracy of final surface layer. The instrument is constructed to be used by a single person.

The grade checker instrument includes: a vertically disposed telescopic surveying rod with graduations, a ground engaging foot on the shaft, and a line reel for paying out line. On the top of the rod is a handle with a bull's-eye or bubble level for determining if the rod is truly vertical.

To use the grade checker, the free end of the line is paid off the reel to a previously measured distance. The free end then is placed at an existing or predetermined grade height such as on a grade stake. A line level is placed on the line and the Grade Checker rod is raised until the line is level. At that point, the height of the rod is measured by reading the graduations to determine the grade. This reading is then compared to required elevation and necessary grade corrections can be noted on grade stake or surface. It is a further use of the present invention to place the free end of the line at a grade stake mark and unreel the line to another grade check mark. The rod can then be raised to match the required elevation reading. Now the surface can be checked by taking the difference between the horizontal reading and that required.

It is a further use of the present invention to be able to hook the free line end of two of the present inventions together and pay out line on both so that the foot of each of the grade checkers is on a surveyor's marking. Now the telescoping rods can be raised to level and the difference between actual and theoretical markings can be determined, and cross measurements can be measured for continued lineal accuracy.

It is a primary object of the present invention to provide a grade checker having increased efficiency and accuracy of taking measurement readings of the final grade.

It is a further object of the present invention to provide a grade checker which can be used by a single person which is light-weight and compact, with easily replaceable parts.

It is a further object of the present invention to provide a grade checker which is simple to understand and operate, and enables a more precise use of a line level when making measurements of elevation.

A full understanding of the construction of the invention, together with the novel features and advantages, will be had from the following detailed description of the preferred embodiment thereof, taken in conjunction with the attached drawing.

DESCRIPTION OF THE PREFERRED EMBODIMENT OF THE INVENTION

Figure 1:
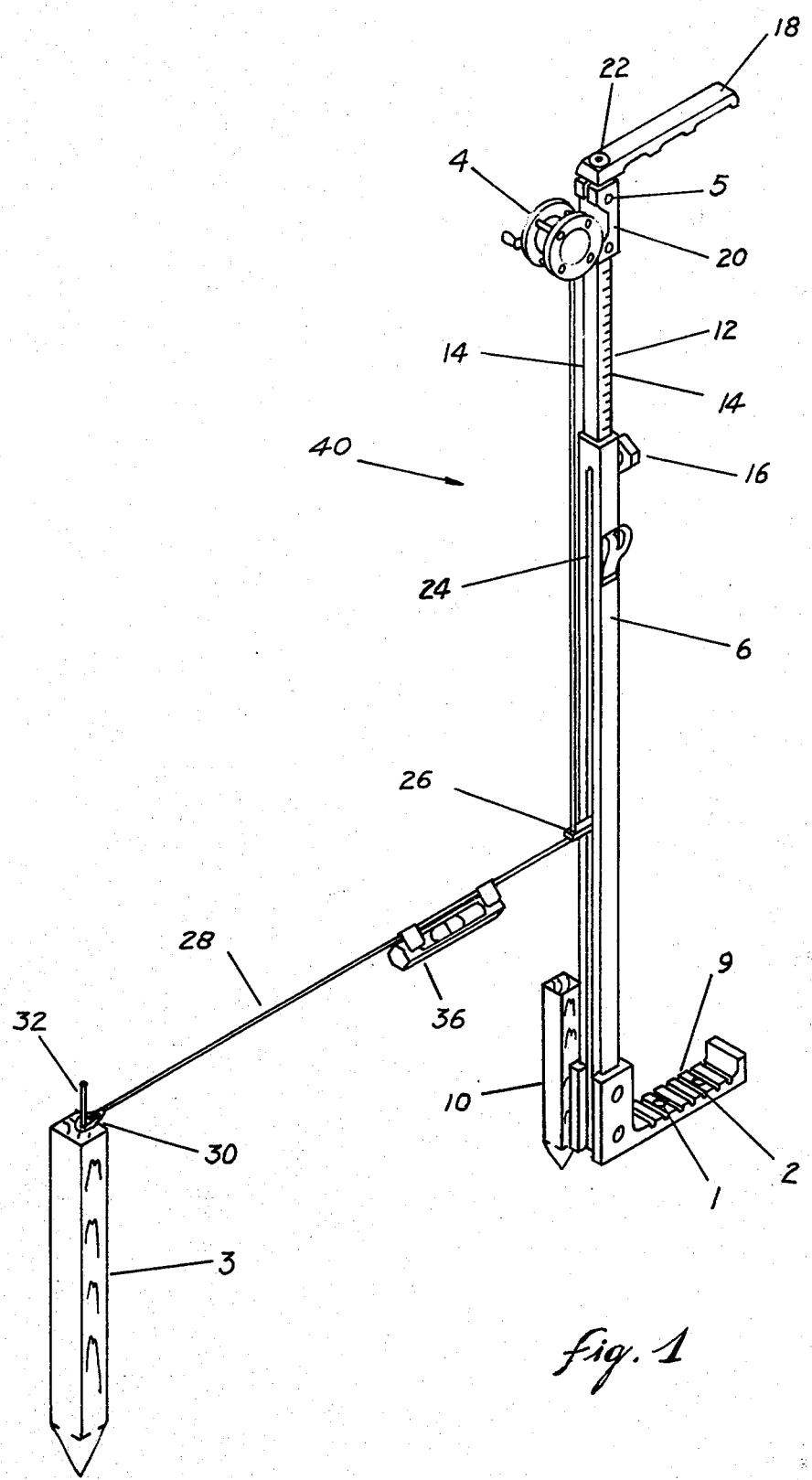
FIG. 1 is an isometric view of the grade checker of the invention, showing the line of the grade checker attached to a conventional grade stake and a line level on the line.

Referring to FIG. 1, there is shown a grade checker 40, connected to a grade stake 3, and next to a different grade stake 10. The grade checker 40 includes a vertically disposed surveying rod 12 and line reel 4. The vertically disposed rod 12 has a hollow tubular/outside shaft 6 with a prependicluar foot 9. The foot 9 is placed on the ground and has a rest on which a person can place their foot to steady the grade checker 40. The foot 9 has two holes 1 and 2 to allow the grade checker 40 to be anchored to the ground by means of spikes or large nails. Slidable within the hollow tubular shaft 6 is the rod 12 with a scale 14 on each opposite side. The scale graduations are in feet, tenths of feet increments, hundredths of feet, and millimeters. Of course, other forms of measurements, such as decimals, may be used. To telescope rod 12 into and out of hollow tubular shaft 6, and to lock two shafts together there is provided an adjustment knob 16.

Affixed to the rod 12 is a handle 18, which is connected to the rod 12 by means of a screw 5 positioned through the handle mounting arm. Mounted on the handle 18, is a bull's-eye or bubble-type level 22, to align the grade checker 40 vertically.

A line reel 4 is mounted on the rod 12 by a connector 20 near the top end of the rod 12. The line reel 4 resembles a fishing reel in appearance, however, other type reels may be used without departing from the invention. A fishing reel is particularly useful in that the reeling in of the line is more evenly distributed on the reel 4. It also has a line tensioning mechanism and positive locking device. The reel handle can be reversed for left hand use.

There is a longitudinal slot 24 in hollow tubular shaft 6 in which a line guide 26 reciprocates. The guide is permanently secured to the lower end of the rod 12 to move up and down in the shaft. A line 28 is payed off reel 4 and threaded through the eyelet of the guide 26. The line 28 may be any heavy-duty line or cord, for example, heavy test fishing line works well. There is a loop 30 on the end of the line 28 for fastening to nail 32 on a grade stake 3.

To use the grade checker 40, the loop of line 28 is fastened to a grade stake 3. The grade stake having been positioned and marked prior to the initial grading operation. The grade stake is marked with the prior grade level of the finished or unfinished grade. The line 28 is payed off of reel 4 to a point where another grade stake 10 or surveyor's marking is located. A line level 36 is fastened to line 28. By standing on the foot 9, and moving the rod 12 until the bull's-eye level indicates "true" vertical, the proper vertical position of the grade checker 40 is found. With the line 28 drawn taunt, the height of the rod is raised or lowered until the bubble in line level 36 is centered. At that point, the adjustment knob 16 is tightened and the vertical height of the grade is read using the scale 14. To determine the final grade, the difference between the surveyor's marking and the marking on the grade checker scale 14 is calculated. The difference shows whether more cutting should be done or whether fill should be added.

The grade checker can be used to replace missing grade stakes, to check highway base and level courses, to install patios or driveways, and to measure trench fall. Also, it can be used to determine cubic yard quantity of earthwork or fill required in landscaping.

Having described my invention, it should be understood that various modifications can be made to the preferred embodiment without departing from the invention, and that the appending claims should be looked to for a definition of the invention.

I claim:

1. A grade checker instrument comprising;
   a vertically adjustable rod having a level and a scale thereon,
   a ground supported hollow shaft having a foot support attached thereto completely telescopingly enclosing and protecting said rod when in closed position and partially enclosing and protecting said rod when in extended position,
   a line guide attached to said rod,
   a handle means mounted on the top of said rod,
   a line reel having line thereon connected to the upper portion of said rod,
   the free end of said line having a loop formed thereon and being passed vertically downwardly through said line guide, then turned horizontally and passed through a line level and adapted to be attached temporarily to a grade stake for indicating grade level.

* * * * *